United States Patent Office 3,766,143
Patented Oct. 16, 1973

3,766,143
BASIC-DYEABLE COPOLYESTER RESINS PREPARED FROM ORTHO AND PARA ISOMERS OF LOWER ALKYL-(SULFOALKOXY) BENZOATES
Mary J. Stewart, Media, Pa., assignor to
FMC Corporation, Philadelphia, Pa.
No Drawing. Filed June 21, 1971, Ser. No. 155,245
Int. Cl. C08g 17/14
U.S. Cl. 260—49
9 Claims

ABSTRACT OF THE DISCLOSURE

Linear copolyester resins containing as an integral part of the polymer chain a substantially equal number of terminal units derived from both the ortho and para isomers of a metal salt of lower alkyl-(sulfoalkoxy) benzoate.

---

This invention relates to highly polymeric linear copolyester resins which have improved dyeability. More particularly, the present invention relates to novel copolyester resins which can be formed into filaments, films and other shaped articles and which can be readily dyed with basic type dyes. The term "basic dye' 'is used herein to denote cationic organic dyes such as, for example, those containing sulfonium, oxonium or quaternary ammonium functional groups.

Many types of copolyesters have been described in the prior art and they can be prepared by various well-known processes. For example, copolyester resins can be prepared by a transesterification and polycondensation process. In the transesterification method, lower dialkyl esters of suitable dicarboxylic acids and diols are used as the initial reactants.

A copolyester resin, such as those of the present invention, which are suitable for filament- and film-forming purposes should have relatively high intrinsic viscosity, preferably not less than about 0.50 (as determined in a 60% phenol-40% tetrachloroethane solution, wt./wt., at 30° C.), a carboxyl content value of below about 50 equivalents per million grams (eq./$10^6$ gr. or meq./kg.), a suitable high melting point and also exhibit a relatively colorless or white color. Especially for filament-forming purposes, it is very desirable and necessary in many instances that the polyester resin be dyeable with cationic or basic dyes.

It is an object of this invention to provide novel highly polymeric saturated copolyester resins.

It is another object of this invention to provide highly polymeric linear copolyester resins, which have physical and chemical properties which make them particularly well suited for filament- and film-forming purposes.

It is a further object of the present invention to provide highly polymeric copolyester resins which are readily dyeable with basic type dyes.

These and other objects are accomplished in accordance with the present invention by providing highly polymeric copolyester resins comprising the condensation polymerization product of (a) at least one lower alkyl ($C_1$ to $C_4$) diester of an aromatic discarboxylic acid, (b) at least one glycol and (c) an effective amount of both the ortho and para isomers of a metal salts of lower alkyl ($C_1$ to $C_4$) (sulfoalkoxy)benzoate in substantially equal quantities.

By "effective amount" or "effective number" as used herein is meant sufficient comonomer concentration or resulting comonomer segments to result in formation of a copolyester resin and filaments prepared therefrom to be dyeable with basic or cationic dyes under normal dyeing procedures such as, for example, as set forth hereinafter. It has been determined that a preferred group of copolyesters of the present invention are those containing from about 1.5 to 2.5 mole percent of a substantially 1:1 mole ratio of the ortho and para isomers of the subject monosulfonate compounds based on the diester content [(a) above] in the resin-forming reaction mixture in view of the depth of dyeing and physical properties obtained.

By the terms "substantially equal quantities," "substantially equal number" or "substantially 1:1 mole ratio" as used herein in relation to the concentration of the subject ortho and para isomers is meant a combination thereof wherein not more than 40% excess of either isomer is present. For the purposes of this invention, it has been determined that the preferred ratio of the subject ortho and para monofunctional sulfonate compounds is 1:1. Greatly improved results, however, are also obtained at ratios as low at 3:2 to 2:3. Even at ratios of 7:3 and 3:7, significant improvement in dyeing results are obtained over the use of either isomer singularly.

The copolyester resins of the present invention can be prepared as stated above by a transesterification process. Obviously, the reactants will be one or more glycols and suitable lower alkyl esters of dicarboxylic acids. All the reactants can be initially combined and charged into suitable reactors wherein the subject process is carried out.

The linear copolyester resin products of the present invention contain as an integral part of the polymer chain an effective and substantially equal number of terminal units represented by the structures

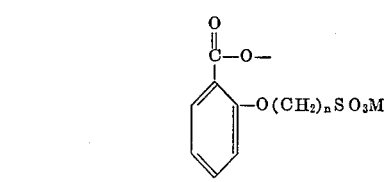

and

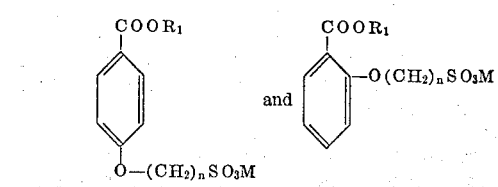

wherein M is preferably an alkali or alkaline earth metal and $n$ is a whole number of from 1 to 6.

Obviously, the structures of the segmented sulfonate monomers set forth above are derived from monofunctional compounds having the following formulas:

wherein $R_1$ is a lower alkyl radical containing from 1 to 4 carbon atoms, $n$ is a positive whole number of from 1 to 6 and M is a metal. In most instances, it is preferred that M be selected from the group consisting of alkaline earth metals and alkali metals.

For example, among the monofunctional ester-forming sulfonate compounds which can be used to form terminal groups in the subject copolyester resins are methyl 4-(3-sulfopropoxy)benzoate, lithium salt
methyl 4-(3-sulfopropoxy)benzoate, sodium salt
methyl 2-(3-sulfopropoxy)benzoate, sodium salt
methyl 4-(2-sulfoethoxy)benzoate, barium salt
butyl 2-(6-sulfohexyloxy)benzoate, sodium salt
butyl 4-(4-sulfobutoxy)benzoate, potassium salt
ethyl 2-(5-sulfopentyloxy)benzoate, calcium salt and their ortho and para isomers as the case may be.

Specifically, the monofunctional sulfonate monomers of the present invention wherein $n$ is 2, 3 or 4 can be most readily prepared as follows. A suitable metal compound or a metal that can be dissolved, such as an alkali metal, is dissolved in a lower alkanol ($C_1$ to $C_3$) to make the corresponding metallic alkoxide. This metallic alkoxide in turn is reacted with a lower alkyl ($C_1$ to $C_4$) o- or p-hydroxybenzoate at the reflux temperature of the alkanol used for about one hour at atmospheric pressure to form the corresponding lower alkyl hydroxybenzoate metallic salt. The alkanol is then removed from the reaction mixture at reduced pressure to give the corresponding crystalline o- or p-lower alkyl hydroxybenzoate, metallic salt.

A mixture of the above prepared o- or p-lower alkyl hydroxybenzoate, metallic salt and an alkane sultone ($C_2$ to $C_4$) at a mole ratio of 1:1 is placed in a reaction vessel containing a large excess of anhydrous dimethylformamide and refluxed for about 4 hours at the boiling point of the reaction mixture at atmospheric pressure. The resulting mixture is filtered. Then the filtrate is evaporated to dryness in vacuo. The concentrated residue is dissolved in boiling methanol and the resulting mixture is then cooled. The precipitate formed is a lower alkyl o- or p-(sulfoalkoxy)benzoate, metallic salt, depending on the reactants used and is isolated by filtering and drying.

To further illustrate the preparation of the monofunctional sulfonate monomers of the present invention, methyl 2-(3-sulfopropoxy)benzoate, sodium salt, can be prepared as follows:

EXAMPLE 1

To 11.5 grams (0.5 g. atom) of sodium previously dissolved in 500 ml. of absolute methanol was added 76 grams (0.5 mole) of methyl salicylate. This mixture was refluxed for one hour, then concentrated to dryness in vacuo to give methyl salicylate, sodium salt.

A mixture of 52 grams (0.3 mole) of methyl salicylate, sodium salt, prepared above, 36.6 grams (0.3 mole) of 1,3-propane sultone and 500 ml. of anhydrous dimethylformamide was refluxed 4 hours. The reaction mixture was kept at room temperature for 3 days and then filtered. The filtrate was evaporated to dryness in vacuo. The resulting residue was then dissolved in 400 ml. of boiling methanol, treated twice with Norit-Celite and evaporated to 250 ml. After cooling overnight in the refrigerator, the precipitate was filtered and identified as methyl 2-(3-sulfopropoxy)benzoate, sodium salt.

EXAMPLE 2

The preparation of methyl 4-(3-sulfopropoxy)benzoate, sodium salt, was accomplished by the same process steps used above in Example 1 to prepare methyl 2-(3-sulfopropoxy)benzoate, sodium salt except that the initial reactants were as follows: 45.2 grams (0.26 mole) of methyl p-hydroxybenzoate, sodium salt was allowed to react with 31.7 grams (0.26 mole) of 1,3-propane sultone in 500 ml. of anhydrous dimethylformamide.

The subject monofunctional monomers represented by the above general formula where $n$ is 1 or 5 to 6 (or 1 to 6, if desired) can be prepared by a combination of process steps involving: (1) reacting a suitable lower alkyl hydroxybenzoate, metallic salt, depending on product desired as described above, with a $C_1$ to $C_6$ alkylene dihalide (instead of an alkane sultone) at a mole ratio of from about 1:2 to 1:5 respectively in a large excess of a suitable solvent, for example, dimethylformamide, under reflux for about 8 hours. Among the alkylene dihalides that can be used, for example, are 1,4-dibromobutane and 1,6-diiodohexane; (2) then sulfonating the resulting monoalkylhaloalkoxy(benzoate) by reacting same with an equal mole ratio of a suitable metal bisulfite, such as sodium bisulfite, in water or a 1:1 water-lower alkanol solution, such as ethanol, under reflux to prepare the corresponding metal (monocarboalkoxyphenoxy)alkane sulfonate. This combination of process steps is known to those skilled in the present art and is disclosed in U.S. Pat. No. 3,238,180.

The copolyester resins of the present invention can be prepared from any of the well-known glycols which are used to prepare saturated linear filament- and film-forming polyester resins. For example, suitable glycols for preparing such copolyesters can be aliphatic (saturated) or cycloaliphatic. Among those which can be used are the aliphatic glycols represented by the formula

$$HO(CH_2)_zOH$$

wherein $z$ is a positive integer of 2 to 10. Cycloaliphatic glycols such as 1,4-cyclohexanedimethanol can also be used. Among the alkylene glycols that can be used are ethylene glycol, butylene glycol and hexylene glycol. Additionally, if indicated, the glycol component can also be composed of in part a gem-dialkyl glycol such as 2,2-dimethyl-1,3-propanediol, 2,2-diethyl - 1,3 - propanediol and the like. Obviously, also any combination of the above-mentioned glycols can be used to prepare the present copolyester resins.

The lower alkyl ($C_1$ to $C_4$) aromatic dicarboxylates which can be used to prepare the subject copolyester resins can be any of those which are thoroughly disclosed through the prior art for such purposes. For example, the dicarboxylates can be the ester counterparts of acids such as terephthalic acid, isophthalic acid, 4,4'-dibenzoic acid, p, p'-dicarboxydiphenylpropane, 4,4'-diphenylsulfone dicarboxylic acid and 2,6-napthalene dicarboxylic acid or suitable lower alkyl diesters thereof or any combination of such monomers. In addition to the cited lower alkyl aromatic dicarboxylates, the subject copolyesters may also contain up to 10 mole percent of segments derived from aliphatic dicarboxylates, such as dimethyl glutarate and dimethyl adipate if desired.

The subject copolyester resins may also contain sulfonate units derived from difunctional ester-forming monomers in addition to the sulfonate units derived from the subject monofunctional monomers. By "difunctional ester-forming organic monomers containing a sulfonate group in the form of a metallic salt" as used herein is meant any organic compound containing (1) two ester-forming groups capable of reacting so as to be united in a polyester chain, for example, carboxylate or hydroxyl groups, and (2) a sulfonate group, $-SO_3M$ wherein M is a suitable metal such as an alkali metal or alkaline earth metal, to act as a dye site for basic dyes. Among the difunctionl sulfonate monomers that can be used are, for example, sodium 3-(3,5-dicarbomethoxyphenoxy)propane sulfonate
sodium 3-(2,4-dicarbomethoxyphenoxy)propane sulfonate
soidum 3,5-di(carbomethoxy)-benzenesulfonate
dimethyl-9,9-bis-(2'-carboxyethyl)-fluorene-2-sodium sulfonate
sodium 4,4-dicarboethoxy-1-butane sulfonate
sodium 1,1,3-trimethyl-5-carbomethoxy-3-(p - carbomethoxyphenyl)-indane sulfonate
1-(p-sodium sulfophenyl)-2,5-dimethyl-3,4-dicarboethoxy pyrrole
4-sodiosulfophenyl-3,5-dicarbomethoxybenzenesulfonate, The first two difunctional sulfonate compounds in the above listing can be prepared by reacting dimethyl 5-hydroxyisophthalate, sodium salt or dimethyl 4-hydroxyisophthalate, sodium salt respectively with propane sultone in an excess of dimethylformamide under reflux, using process steps and mole ratios of reactants set forth hereinbefore in relation to the preparation of the corresponding monofunctional sulfonate compounds, and then recovering the desired product.

Diethyl 2-methyl-2-(p-sulfophenoxy)malonate, sodium salt, the preparation of which is described in U.S. patent application Ser. No. 37,838, filed May 15, 1970, now U.S. Pat. No. 3,624,034, can also be used as a difunctional sulfonate monomer to prepare the copolyesters of the present invention.

The subject copolyester resins may contain 0.1 to 10 mole percent of units derived from the above-described difunctional sulfonate monomers but preferably 0.2 to 5 mole percent.

In the ester-interchange or transesterification method of preparing the subject copolyesters, a mole ratio of glycol to suitable diester of from about 1:1 to about 15:1 may be used, but preferably from about 1.5:1 to about 2.6:1. The transesterification reaction is generally carried out at atmospheric pressure in an inert atmosphere such as nitrogen, initially at a temperature range from about 125° C. to about 250° C. but preferably from about 150° C. to 200° C. in the presence of a transesterification catalyst. An alkyl alcohol corresponding to the dialkyl ester of the dicarboxylic acid used is evolved and continuously removed by distillation. After a reaction period of 1 to 2 hours, the temperature of the reaction mixture is raised from about 200° C. to about 230° C. over approximately a one hour period in order to complete the reaction, form the desired polyester prepolymer and distill off some of the excess diol which is present.

Any of the well-known and suitable transesterification or ester-interchange catalysts, for example, lithium amide, lithium hydride, or zinc acetate can be used to catalyze the present transesterification reaction. In most instances, the present transesterification catalyst is used in concentrations ranging from 0.01% to about 0.20% based on the weight of the dialkyl ester of the dicarboxylic acid used in the initial reaction mixture.

The polycondensation of the prepolymers prepared by the above transesterification process is accomplished by adding a suitable polycondensation catalyst to the polyester prepolymer and heating the blend thereof under reduced pressures of within the range of about 0.01 mm. to 20 mm. of mercury while under agitation at a temperature of about 260° C. to 325° C. for from 2 to 4 hours. Any suitable polycondensation catalyst can be used, for example, antimony oxalate, antimony trioxide or disodium lead ethylene diamine tetraacetate.

Various other materials may be present in the reaction mixture used to prepare the subject copolyester resins. For example, color inhibitors such as alkyl or aryl phosphate and phosphite esters may be used. In addition, pigments and delustrants such as titanium dioxide can be present. Among well-known color inhibitors used are tricresylphosphate and triphenylphosphite.

The subject copolyester resins containing the specified sulfonate end units in the polymer chain can also be prepared directly by an in situ process as illustrated by the following Examples 3 to 5.

EXAMPLE 3

1.42 grams of metallic sodium was dissolved in 65 mls. of methyl alcohol to form sodium methoxide. To this solution was added 9.4 grams of methyl salicylate. The resulting solution consisting of the sodium salt of methyl salicylate in methanol was added to a reaction kettle containing 589 grams of molten dimethyl terephthalate. The reaction kettle was equipped with a nitrogen inlet, a distilling arm, heating means and stirring means. The pot temperature during the addition of the sodium salt of methyl salicylate in methyl alcohol was between 167–185° C. and the reaction kettle was at atmospheric pressure. The addition of this solution to the molten dimethyl terephthalate took approximately 53 minutes. Then, when the reaction mixture was about 164° C., 7.55 grams of propane sultone was added to the reaction mixture. The appearance of the reaction mixture changed from a cloudy yellow to a very clear lemon yellow. Approximately 8 minutes after the addition of the propane sultone, the addition of 150 mls. of ethylene glycol to the reaction mixture was started and was continued over a one hour period. Then, an additional 160 mls. of ethylene glycol containing 0.24 gram of lithium hydride was added over a 45 minute period during which time the temperature was about 154° C. An additional 100 mls. of ethylene glycol was added at the end of which the reaction mixture was at a temperature of 146° C. Then, the temperature of the reaction mixture under a nitrogen blanket was allowed to raise to 230° C. at atmospheric pressure over a period of about 2 hours during which time substantially all of the by-product methanol was distilled from the reaction mixture. The prepolymer formed was then cooled under a nitrogen atomsphere.

EXAMPLE 4

1.42 grams of metallic sodium was dissolved in 75 mls. of methyl alcohol to form sodium methoxide. To this solution was added 4.7 grams of methyl salicylate and 4.7 grams of methyl p-hydroxybenzoate. The resulting solution consisting of the sodium salts of methyl salicylate and methyl p-hydroxybenzoate in methanol was then added to a reaction kettle containing 600 grams of molten dimethyl terephthalate. The reaction kettle was equipped with a nitrogen inlet, a distilling arm, heating means and stirring means. The pot temperature during the addition of this above-identified sodium salt solution was between about 160 and 179° C. and was maintained at atmospheric pressure. The addition of this solution to the molten dimethyl terephthalate took approximately 30 minutes. Then, when the reaction mixture was at about 156° C., 7.55 grams of propane sultone was added to the reaction mixture. The appearance of the reaction mixture became almost clear. Then, 200 mls. of ethylene glycol was added to the reaction mixture over a 25 minute period. Next, 0.24 gram of lithium hydride was dispersed in 150 mls. of ethylene glycol and this solution was added to the reaction mixture over about a 23 minute period. The temperature of the reaction mixture at this time was about 149° C. Then, an additional 150 mls. of ethylene glycol was added and the temperature of the reaction mixture was allowed to rise to about 230° C. at atmospheric pressure over about a 2½ hour period during which time substantially all of the by-product methanol was distilled from the reaction mixture. The prepolymer formed was then cooled under a nitrogen atmosphere.

EXAMPLE 5

1.42 grams of metallic sodium was dissolved in 65 mls. of methyl alcohol. To this solution was added 9.4 grams of methyl p-hydroxybenzoate. The resulting solution consisting of the sodium salt of methyl p-hydroxybenzoate in methanol was then added to a reaction kettle containing 600 grams of molten dimethyl terephthalate. The reaction kettle was equipped with a nitrogen inlet, a distilling arm, heating means and stirring means. The pot temperature during the addition of the above-identified sodium salt solution was between about 145–170° C. and was maintained at atmospheric pressure. The addition of this solution to the molten dimethyl terephthalate took approximately 30 minutes. Then, when the reaction mixture was about 157° C., 7.55 grams of propane sultone was added to the reaction mixture. The appearance of the reaction mixture changed from a cloudy yellow to an almost colorless solution. Then, 200 mls. of ethylene glycol was added over a 20 minute period. Next, 0.24 gram of lithium hydride dispersed in ethylene glycol was added to the reaction mixture at the end of which the temperature of the reaction mixture was about 147° C. An additional 50 mls. of ethylene glycol was added. Then the temperature of the reaction mixture was allowed to rise to 230° C. at atmospheric pressure over a period of about 2 hours during which time substantially all of the by-product methanol was distilled from the reaction mixture. The prepolymer product formed was cooled under a nitrogen atmosphere.

The prepolymer products formed in Examples 3, 4 and 5 above were polycondensed separately to form copolymeric filament-forming resins as follows: 150 grams of prepolymer, 0.09 gram of antimony trioxide and 0.5 ml. of tritolylphosphate were placed in a reaction vessel. The reaction mixture was heated to about 240° C. over a period of approximately 45 minutes. Heating was continued and vacuum applied during the next 45 minutes. At the end of this period, the pressure in the reaction vessel was about 10 mm. of mercury and the temperature was about 260° C. The temperature was then elevated to about 280° C. and the pressure reduced to about 0.6 mm. of mercury. Then, the reaction mixture was held at about 280° C. for 2 hours under a vacuum of approximately 0.6 mm. to 0.1 mm. of mercury to complete the polycondensation of the prepolymer product. hTe ethylene terephthalate copolyester resins formed from the prepolymer products of Examples 3, 4 and 5 contained terminal units corresponding to the following mole percents of the stated monofunctional sulfonate compounds:

Example 3—2 mole percent methyl 2-(3-sulfopropoxy) benzoate, sodium salt;

Example 4—1 mole percent methyl 4-(3-sulfopropoxy) benzoate, sodium salt and 1 mole percent methyl 2-(3-sulfopropoxy)benzoate, sodium salt; and Example 5—2 mole percent of methyl 4-(3-sulfopropoxy) benzoate, sodium salt.

The copolyester resin products prepared from the prepolymers of Examples 3, 4 and 5 were spun into fibers of 250 denier per 10 filaments and then drawn to 70 denier per 10 filaments. Knitted sleeves were then prepared from these fibers products for dyeing evaluation purposes.

The properties of the polycondensation resin products prepared above from the prepolymers of Examples 3, 4 and 5, as determined on the fibers prepared, were as follows:

|  | Intrinsic viscosity | Carboxyl value (meq./kg.) | Diethylene glycol (wt. percent) |
| --- | --- | --- | --- |
| Example 3 copolymer fiber product | 0.55 | 11 | 0.85 |
| Example 4 copolymer fiber product | 0.49 | 13 | 0.73 |
| Example 5 copolymer fiber product | 0.58 | 16 | 0.82 |

EXAMPLE 6

97 pounds of dimethyl terephthalate, 67 pounds of ethylene glycol, 1730 grams of the sodium salt of methyl 4-(3-sulfopropoxy)benzoate, 312 grams sodium 3,5-di(carbomethoxy)benzenesulfonate and 18.2 grams of lithium hydride were charged into a reaction vessel equipped with a distilling column, heating means and stirring means. The reaction mixture was agitated and heated over a 4 hour period to bring about a transesterification reaction between the above reactants. At the end of the 4 hour period, the temperature of the reaction mixture was about 440° F. and all by-product methanol that was produced was distilled from the reaction mixture. Then 27.2 grams of antimony trioxide and 430 grams of tritolylphosphate was added to the reaction mixture. The temperature of the reaction mixture was elevated and at the end of a 50 minute period was 500° F. At this time, vacuum was started and the pressure was reduced to 1 mm. of mercury during the next 60 minutes at the end of which the reaction temperature was 532° F. The pressure was further reduced to 0.5 mm. of mercury and the temperature increased to 540° F. under which conditions the reaction mixture was held for 2 hours and 15 minutes to form a filament-forming copolyester resin. The resulting resin product had an intrinsic viscosity of 0.43, a carboxyl value of 36 meq./kg., a diethylene glycol content of 0.96 weight percent and a DTA melting point of 260° C.

EXAMPLE 7

97.5 pounds of dimethyl terephthalate, 67 pounds of ethylene glycol, 692 grams of the sodium salt of methyl 4-(3-sulfopropoxy)benzoate, 692 grams of the sodium salt of methyl 2-(3-sulfopropoxy)benzoate, 312 grams sodium 3,5-di(carbomethoxy)benzenesulfonate and 18.2 grams of lithium hydride were charged into a reaction vessel equipped with a distilling column, heating means and stirrng means. The reaction mixture was agitated and heated over a 5½ hour period to bring about a transesterification reaction between the above reactants. At the end of the 5½ hour period, the temperature of the reaction mixture was about 450° F. and all by-product methanol that was produced was distilled from the reaction mixture. Then 27.2 grams of antimony trioxide and 430 grams of tritolylphosphate was added to the reaction mixture. The temperature of the reaction mixture was elevated and at the end of a 90 minute period was 477° F. At this time, vacuum was started and the pressure was reduced to 1 mm. of mercury during the next 180 minutes at the end of which the reaction temperature was 520° F. The pressure was further reduced to 0.5 mm. of mercury and the temperature increased to 540° F. under which conditions the reaction mixture was held for 2 hours to form a filament-forming copolyester resin.

The resulting resin product had an intrinsic viscosity of 0.44, a carboxyl value of 24 meq./kg., a diethylene glycol content of 1.52 weight percent, and a DTA melting point of 250° C.

EXAMPLE 8

97.5 pounds of dimethyl terephthalate, 67 pounds of ethylene glycol, 1384 grams of the sodium salt of methyl 2-(3-sulfopropoxy)benzoate, 312 grams sodium 3,5-di(carbomethoxy)benzenesulfonate and 18.2 grams of lithium hydride were charged into a reaction vessel equipped with a distilling column, heating means and stirring means. The reaction mixture was agitated and heated over a 4 hour period to bring about a transesterification reaction between the above reactants. At the end of the 4 hour period, the temperature of the reaction mixture was about 442° F. and all by-product methanol that was produced was distilled from the reaction mixture. Then 27.7 grams of antimony trioxide and 430 grams of tritolylphosphate was added to the reaction mixture. The temperature of the reaction mixture was elevated and at the end of a 70 minute period was 482° F. At this time vacuum was started and the pressure was reduced to 1.0 mm. of mercury during the next 120 minutes at the end of which the reaction temperature was 525° F. The pressure was further reduced to 0.5 mm. of mercury and the temperature increased to 540° F. under which conditions the reaction mixture was held for 3 hours to form a filament-forming copolyester resin. The resulting resin product had an intrinsic viscosity of 0.45, a carboxyl value of 12 meq./kg., a diethylene glycol content of 1.14 weight percent and a DTA melting point of 259° C.

All of the intrinsic viscosity values disclosed herein were determined in a 60% phenol-40% tetrachlorethane solution, wt./wt., at 30° C. The other analytical values set forth in the examples were determined by conventional laboratory procedures.

If indicated, dependent on end use, the molecular weight of the present copolyester resin products can be increased by lengthening the polycondensation stage or by use of a solid phase polymerization step.

The ethylene terephthalate copolyesters resin products of Examples 6, 7 and 8 contain units corresponding to the following mole percents of the stated sulfonate compounds:

Example 6—2.5 mole percent methyl 4-(3-sulfopropoxy)benzoate, sodium salt and 0.45 mole percent sodium 3,5-di(carbomethoxy)-benzenesulfonate;

Example 7—1 mole percent methyl 4-(3-sulfopropoxy) benzoate, sodium salt, 1 mole percent methyl 2-(3-sulfopropoxy)benzoate, sodium salt and 0.45 mole percent sodium 3,5-di(carbomethoxy)-benzenesulfonate;

Example 8—2 mole percent of methyl 2-(3-sulfopropoxy)benzoate, sodium salt and 0.45 mole percent sodium 3,5-di(carbomethoxy)-benzenesulfonate.

The copolyester resin products prepared in Examples 6, 7 and 8 were spun into fibers, drawn (resulting in about 70 denier fiber) and sleeves were prepared from these fiber products for dyeing evaluation.

For illustration purposes, the dyeabality of the copolyester resin products prepared in the above examples was tested with cationic or basic type dyestuffs. The numerical values given below the heading "cationic dye value" in the following table were obtained by measuring the reflectance of the dyed fiber product with a "Color-Dye" (Model D–1) which is the trademark for a differential colorimeter manufactured by the Instrument Development Laboratories, Attleboro, Mass. The color values obtained are based on luminance (Y in the C.I.E. System) which is a measure of the proportion of the incidence light reflected by the sample relative to a white vitrolite standard and, therefore, a measure of the whiteness of the copolyester resin product being evaluated. Based on a theoretically possible Y value of 100, the higher the Y value, the whiter the resin product. Correspondingly, the lower the Y value or number, the more deep or intense the color of the dyed resin product. The determination of Y in the C.I.E. System as hereinafter set forth was carried out by using knitted sleeves prepared from the copolyester fiber products made in Examples 3 to 8 above. Each fiber product prepared from the resins made in the above examples was dyed competitively with a "cationic dyeable fiber control" which had been standardized for comparative purposes to a cationic dye value (Y) of 6.0.

The knitted sleeves prepared from the subject copolyester resin samples were subjected to the following dyeing procedure.

Cationic Dye Test

The 70 denier fiber knitted sleeves are first weighed. Generally, each sleeve weighs about 5 grams. Then, the following dyeing procedure is carried out consecutively as follows:

(1) The sample sleeve is scoured in a solution of 800 ml. of water containing 10 ml. of a "pre-scour solution" for about 15 minutes at 180° F. The said "pre-scour solution" is prepared by stirring 12 ml. Alkanol HCS (10% solution) and 12 ml. of a 5% tetrasodium pyrophosphate in water, into 1000 ml. of hot water.

(2) After scouring, the sleeve is rinsed well with 100° F. water for about 5 minutes.

(3) Then, 5% Sevron Blue ER (basic dye) based on the weight of the sample sleeve is pasted with 0.3 ml. of a 56% glacial acetic acid solution in water and 10 ml. of hot water and stirred until dissolved.

(4) 25% Latyl Carrier "A," based on the weight of the sample sleeve is pasted with 1 ml. of a 10% Alkanol HCS solution and 10 ml. hot water and stirred until dissolved.

(5) A bath is prepared by adding 1 ml. of a 10% $Na_2SO_4 \cdot 10H_2O$ solution in water to 800 m. of warm water (130° F.).

(6) The prepared dye solution (#3 above) is stirred into the sodium sulfate bath (#5 above) and then the sample sleeve is placed therein. The temperature of the resulting solution containing the sleeve is raised to 170° C. over a 15 minute period. At the end of this period, the sample sleeve is removed from the dye bath and the carrier solution (#4 above) is added to the dye bath. Then, the sample sleeve is returned to the resulting bath containing dye and carrier.

(7) The dye bath is brought to a boil in about 20 minutes and maintained at a boil for 2 hours. The water level is maintained by adding hot water. Sleeve sample in dye bath is stirred frequently.

(8) Then, the dyed sleeve is scoured in a solution composed of 800 ml. of water and 10 ml. of an "after-scour solution" for approximately 10 minutes at 140° F. The "after-scour solution" is prepared by adding 10 ml. of a 10% Igepon T–51 solution and 5 ml. of a 10% $Na_2CO_3$ solution in water to 1000 ml. of hot water. Finally, the sample sleeve is rinsed with clear warm water and dried.

TABLE

| Fiber product | Cationic dye value (Y in the C.I.E. System) | Resin sulfur content (wt. percent) |
| --- | --- | --- |
| (a) Example 3—Copolyester resin | *16.9 (12.4) | 0.28 |
| (b) Example 4—Copolyester resin | *9.4 (6.9) | 0.27 |
| (c) Example 5—Copolyester resin | *27.8 (18.5) | 0.27 |
| (d) Example 6—Copolyester resin | *8.3 (5.3) | 0.43 |
| (e) Example 7—Copolyester resin | *6.5 (4.2) | 0.33 |
| (f) Example 8—Copolyester resin | *10.3 (6.7) | 0.34 |
| (g) Polyethylene terephthalate homopolymer control | *58.3 (37.7) | |
| (h) Cationic dyeable resin control | *6.0 (3.9–4.4) | 0.34 |

EXAMPLES 9 AND 10

Ethylene terephthalate copolyester resin fibers were prepared containing terminal units corresponding to the following mole percent of the stated monofunctional sulfonate compounds.

Example 9—0.8 mole percent methyl 4-(3-sulfopropoxy)benzoate, sodium salt and 1.2 mole percent methyl 2-(3-sulfopropoxy)benzoate, sodium salt;

Example 10—1.2 mole percent methyl 4-(3-sulfopropoxy)benzoate, sodium salt and 0.8 mole percent methyl 2-(3-sulfopropoxy)benzoate, sodium salt.

The fiber products of Examples 9 and 10 were dyed and the following results were obtained:

|  | Cationic dye value (Y in the C.I.E. System) |
| --- | --- |
| Example 9 copolyester resin | 10.1* (7.2) |
| Example 10 copolyester resin | 14.1* (10.0) |
| Cationic dyeable resin control | 6.0* (4.3) |

The above values given in the table and in relation to Examples 9 and 10 marked with an asterisk (*) are corrected values based on the cationic dyeable control (h) having a dye value of 6.0. The values in parenthesis are the actual readings (Y) obtained.

The results of the above examples and those disclosed in the table clearly indicate the novel and excellent dyeing results obtained with the copolyester resins of the present invention containing the specified amount of terminal units derived from both the ortho and para isomers of a metal lower alkyl (sulfoalkoxy)benzoate.

I claim:

1. A polycondensation resin comprising a linear, filament-forming copolyester resin which is a polycondensation product of (a) at least one lower alkyl diester of an aromatic dicarboxylic acid, (b) at least one saturated aliphatic glycol having from 2 to 10 carbon atoms or a cycloaliphatic glycol and (c) substantially equal molar amounts of both the ortho and para isomers of an alkali or alkaline earth metal salt of a lower alkyl ($C_1$ to $C_4$)-(sulfoalkoxy)benzoate wherein the sulfoalkoxy group contains from 1 to 6 carbon atoms, the isomer units being present in the polymer chains in an amount sufficient to improve the basic dyeability of the copolyester resin.

2. The polycondensation resin of claim 1 wherein the aromatic dicarboxylic acid is terephthalic acid.

3. The polycondensation resin of claim 1 wherein (a) is dimethyl terephthalate, (b) is ethylene glycol and (c)

is a 1:1 ratio of methyl 4-(3-sulfopropoxy)benzoate, sodium salt and methyl 2-(3-sulfopropoxy)benzoate, sodium salt.

4. The polycondensation resin of claim 1 wherein the copolyester resin is a polycondensation product of (a), (b), (c) and (d) which is about 0.2 to 5 mol percent based on the weight of said resin of at least one lower alkyl diester of an aliphatic or aromatic dicarboxylic acid containing a sulfonate group in the form of a metallic salt.

5. The polycondensation resin of claim 4 wherein (d) is sodium 3-(3,5-dicarbomethoxyphenoxy)-propane sulfonate.

6. The polycondensation resin of claim 4 wherein (d) is sodium 3,5-di(carbomethoxy)-benzene sulfonate.

7. The polycondensation resin of claim 1 wherein the sulfoalkoxy group contains 3 carbon atoms.

8. The polycondensation resin of claim 1 wherein (c) is 1 mole percent of the ortho isomer and 1 mole percent of the para isomer based on the concentration of (a).

9. The polycondensation resin of claim 1 in the form of filaments.

References Cited
UNITED STATES PATENTS

| 3,222,299 | 12/1965 | MacDowell | 260—2.3 |
| 2,740,808 | 4/1956 | Barber | 260—512 |
| 3,317,632 | 5/1967 | Quisenberry et al. | 260—860 |
| 3,238,180 | 3/1966 | Wiloth | 260—47 |
| 3,018,272 | 1/1962 | Griffing et al. | 260—75 |
| 3,663,508 | 5/1972 | Mobius et al. | 260—49 |

HAROLD D. ANDERSON, Primary Examiner

L. L. LEE, Assistant Examiner

U.S. Cl. X.R.

8—179; 66—168; 260—33.4 P, 40 R, 40 P, 45.7 P

UNITED STATES PATENT OFFICE
CERTIFICATE OF CORRECTION

Patent No. 3,766,143       Dated October 16, 1973

Inventor(s) Mary J. Stewart

It is certified that error appears in the above-identified patent and that said Letters Patent are hereby corrected as shown below:

Col. 1, line 64, "salts" should read --salt--.
Col. 3, lines 23, 29, 30 & 40, "o- or p-" should read --o- or p- --.
Col. 4, line 67, "soidum" should read --sodium--.
Col. 7, line 25, "hTe" should read --The--; line 42, "fibers" should read --fiber--.
Col. 8, line 50, "27.7" should read --27.2--; line 74, "copolyesters" should read --copolyester--.
Col. 9, line 68, "800 m." should read --800 ml.--.

Signed and sealed this 14th day of May 1974.

(SEAL)
Attest:

EDWARD M.FLETCHER,JR.
Attesting Officer

C. MARSHALL DANN
Commissioner of Patents